(12) United States Patent  (10) Patent No.: US 8,331,586 B2
Jiang et al.  (45) Date of Patent: Dec. 11, 2012

(54) THERMOACOUSTIC DEVICE

(75) Inventors: Kai-Li Jiang, Beijing (CN); Lin Xiao, Beijing (CN); Zhuo Chen, Beijing (CN); Chen Feng, Beijing (CN); Liang Liu, Beijing (CN); Peng Liu, Beijing (CN); Li Qian, Beijing (CN); Qun-Qing Li, Beijing (CN); Shou-Shan Fan, Beijing (CN)

(73) Assignees: Tsinghua University, Beijing (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 282 days.

(21) Appl. No.: 12/655,375

(22) Filed: Dec. 30, 2009

(65) Prior Publication Data

US 2010/0166231 A1 Jul. 1, 2010

(30) Foreign Application Priority Data

Dec. 30, 2008 (CN) .......................... 2008 1 0241985

(51) Int. Cl.
*H04R 25/00* (2006.01)
(52) U.S. Cl. ........................................ 381/164; 977/949
(58) Field of Classification Search .................. 381/164; 977/949
See application file for complete search history.

(56) References Cited

U.S. PATENT DOCUMENTS

| | | | |
|---|---|---|---|
| 1,407,726 A * | 2/1922 | Browne et al. | ................. 381/164 |
| 1,528,774 A | 3/1925 | Kranz | |
| 4,002,897 A | 1/1977 | Kleinman et al. | |
| 4,334,321 A | 6/1982 | Edelman | |
| 4,503,564 A | 3/1985 | Edelman et al. | |
| 4,641,377 A | 2/1987 | Rush et al. | |
| 4,689,827 A | 8/1987 | Gurney, Jr. | |
| 4,766,607 A | 8/1988 | Feldman | |
| 5,694,477 A | 12/1997 | Kole | |
| 6,473,625 B1 | 10/2002 | Williams et al. | |
| 6,777,637 B2 | 8/2004 | Nakayama et al. | |
| 6,803,116 B2 | 10/2004 | Ikeda | |
| 6,803,840 B2 * | 10/2004 | Hunt et al. | ..................... 333/186 |
| 6,808,746 B1 | 10/2004 | Dai et al. | |
| 6,921,575 B2 | 7/2005 | Horiuchi et al. | |

(Continued)

FOREIGN PATENT DOCUMENTS

CN 2302622 12/1998

(Continued)

OTHER PUBLICATIONS

Xiao, Lin, et al.; "Flexible, Stretchable, Transparent Carbon Nanotube Thin Film Loudspeakers"; Oct. 29, 2008; Nano Letters; vol. 8, No. 12; pp. 4539-4545.*

(Continued)

*Primary Examiner* — Curtis Kuntz
*Assistant Examiner* — Ryan Robinson
(74) *Attorney, Agent, or Firm* — Altis Law Group, Inc.

(57) ABSTRACT

A thermoacoustic device includes a substrate, at least one first electrode, at least one second electrode and a sound wave generator. The at least one first electrode and the at least one second electrode are disposed on the substrate. The sound wave generator is contacting with the at least one first electrode and the at least one second electrode. The sound wave generator is suspended on the substrate via the first electrode and the second electrode. The sound wave generator includes a carbon nanotube structure.

20 Claims, 6 Drawing Sheets

U.S. PATENT DOCUMENTS

| | | | |
|---|---|---|---|
| 7,045,108 | B2 | 5/2006 | Jiang et al. |
| 7,130,436 | B1 | 10/2006 | Tabata et al. |
| 7,393,428 | B2 | 7/2008 | Huang et al. |
| 7,474,590 | B2* | 1/2009 | Watabe et al. ............... 367/140 |
| 7,723,684 | B1* | 5/2010 | Haddon et al. ............ 250/338.1 |
| 7,799,163 | B1 | 9/2010 | Mau et al. |
| 7,881,157 | B2* | 2/2011 | Watabe et al. ............... 367/140 |
| 2001/0005272 | A1 | 6/2001 | Buchholz |
| 2001/0048256 | A1 | 12/2001 | Miyazaki et al. |
| 2002/0076070 | A1 | 6/2002 | Yoshikawa et al. |
| 2003/0038925 | A1 | 2/2003 | Choi |
| 2003/0165249 | A1 | 9/2003 | Higuchi |
| 2004/0053780 | A1 | 3/2004 | Jiang et al. |
| 2005/0006801 | A1 | 1/2005 | Kinloch et al. |
| 2005/0040371 | A1 | 2/2005 | Watanabe et al. |
| 2005/0201575 | A1* | 9/2005 | Koshida et al. ............... 381/164 |
| 2006/0072770 | A1 | 4/2006 | Miyazaki |
| 2006/0104451 | A1 | 5/2006 | Browning et al. |
| 2006/0147081 | A1 | 7/2006 | Mango, III et al. |
| 2006/0264717 | A1 | 11/2006 | Pesach et al. |
| 2007/0145335 | A1 | 6/2007 | Anazawa |
| 2007/0164632 | A1 | 7/2007 | Adachi et al. |
| 2007/0166223 | A1 | 7/2007 | Jiang et al. |
| 2007/0176498 | A1 | 8/2007 | Sugiura et al. |
| 2008/0063860 | A1 | 3/2008 | Song et al. |
| 2008/0095694 | A1 | 4/2008 | Nakayama et al. |
| 2008/0170982 | A1 | 7/2008 | Zhang et al. |
| 2008/0248235 | A1 | 10/2008 | Feng et al. |
| 2008/0260188 | A1 | 10/2008 | Kim |
| 2008/0299031 | A1 | 12/2008 | Liu et al. |
| 2009/0016951 | A1 | 1/2009 | Kawabata et al. |
| 2009/0028002 | A1 | 1/2009 | Sugiura et al. |
| 2009/0045005 | A1 | 2/2009 | Byon et al. |
| 2009/0085461 | A1 | 4/2009 | Feng et al. |
| 2009/0096346 | A1 | 4/2009 | Liu et al. |
| 2009/0096348 | A1 | 4/2009 | Liu et al. |
| 2009/0145686 | A1 | 6/2009 | Watabe et al. |
| 2009/0153012 | A1 | 6/2009 | Liu et al. |
| 2009/0167136 | A1 | 7/2009 | Liu et al. |
| 2009/0167137 | A1 | 7/2009 | Liu et al. |
| 2009/0196981 | A1 | 8/2009 | Liu et al. |
| 2009/0232336 | A1 | 9/2009 | Pahl |
| 2010/0054502 | A1 | 3/2010 | Miyachi |
| 2010/0054507 | A1 | 3/2010 | Oh et al. |
| 2010/0086166 | A1 | 4/2010 | Jiang et al. |
| 2010/0166232 | A1 | 7/2010 | Liu et al. |
| 2010/0233472 | A1 | 9/2010 | Liu et al. |
| 2011/0171419 | A1 | 7/2011 | Li et al. |

FOREIGN PATENT DOCUMENTS

| | | |
|---|---|---|
| CN | 2327142 | 6/1999 |
| CN | 2425468 | 3/2001 |
| CN | 1407392 | 4/2003 |
| CN | 1443021 | 9/2003 |
| CN | 1698400 | 11/2005 |
| CN | 2779422 Y | 5/2006 |
| CN | 1787696 | 6/2006 |
| CN | 2787870 | 6/2006 |
| CN | 2798479 | 7/2006 |
| CN | 1821048 | 8/2006 |
| CN | 1886820 | 12/2006 |
| CN | 1944829 | 4/2007 |
| CN | 1982209 | 6/2007 |
| CN | 1997243 | 7/2007 |
| CN | 101239712 | 8/2008 |
| CN | 101284662 | 10/2008 |
| CN | 201150134 | 11/2008 |
| CN | 101314464 | 12/2008 |
| CN | 101471213 | 7/2009 |
| CN | 101715155 | 5/2010 |
| CN | 101400198 | 9/2010 |
| JP | 49-24593 | 3/1974 |
| JP | 58-9822 | 1/1983 |
| JP | 60-22900 | 2/1985 |
| JP | 1-255398 | 10/1989 |
| JP | 3-147497 | 6/1991 |
| JP | 4-126489 | 4/1992 |
| JP | 6-33390 | 4/1994 |
| JP | 7-282961 | 10/1995 |
| JP | 9-105788 | 4/1997 |
| JP | 11-282473 | 10/1999 |
| JP | 11-300274 | 11/1999 |
| JP | 2001333493 | 11/2001 |
| JP | 2002-186097 | 6/2002 |
| JP | 2002-352940 | 12/2002 |
| JP | 2002346996 | 12/2002 |
| JP | 2002542136 | 12/2002 |
| JP | 2003500325 | 1/2003 |
| JP | 2003-154312 | 5/2003 |
| JP | 2003198281 | 7/2003 |
| JP | 2003-266399 | 9/2003 |
| JP | 2003-319490 | 11/2003 |
| JP | 2003-319491 | 11/2003 |
| JP | 2003-332266 | 11/2003 |
| JP | 20042103 | 1/2004 |
| JP | 2004-107196 | 4/2004 |
| JP | 2004229250 | 8/2004 |
| JP | 2005-20315 | 1/2005 |
| JP | 2005-51284 | 2/2005 |
| JP | 2005-73197 | 3/2005 |
| JP | 2005-97046 | 4/2005 |
| JP | 2005189322 | 7/2005 |
| JP | 2005-235672 | 9/2005 |
| JP | 2005-318040 | 11/2005 |
| JP | 2005-534515 | 11/2005 |
| JP | 2005-341554 | 12/2005 |
| JP | 2005333601 | 12/2005 |
| JP | 2006-93932 | 4/2006 |
| JP | 2006-180082 | 7/2006 |
| JP | 2006-202770 | 8/2006 |
| JP | 2006-217059 | 8/2006 |
| JP | 2006270041 | 10/2006 |
| JP | 2007-24688 | 2/2007 |
| JP | 2007-54831 | 3/2007 |
| JP | 2007-167118 | 7/2007 |
| JP | 2007-174220 | 7/2007 |
| JP | 2007-187976 | 7/2007 |
| JP | 2007-196195 | 8/2007 |
| JP | 2007-228299 | 9/2007 |
| JP | 2007-527099 | 9/2007 |
| JP | 2008-62644 | 3/2008 |
| JP | 2008-101910 | 5/2008 |
| JP | 2008-163535 | 7/2008 |
| JP | 2008-269914 | 11/2008 |
| JP | 2009-31031 | 2/2009 |
| JP | 2009-91239 | 4/2009 |
| JP | 2009-94074 | 4/2009 |
| JP | 2009-146896 | 7/2009 |
| JP | 2009-146898 | 7/2009 |
| JP | 2009-164125 | 7/2009 |
| JP | 2009-184907 | 8/2009 |
| JP | 2009-184908 | 8/2009 |
| KR | 10-0761548 | 9/2007 |
| TW | 200740976 | 11/2007 |
| TW | 200744399 | 12/2007 |
| TW | 201029481 | 8/2010 |
| WO | WO0073204 | 12/2000 |
| WO | WO2004012932 | 2/2004 |
| WO | WO2005102924 | 11/2005 |
| WO | WO2005120130 | 12/2005 |
| WO | WO2007043837 | 4/2007 |
| WO | WO2007049496 | 5/2007 |
| WO | WO2007052928 | 5/2007 |
| WO | WO2007099975 | 9/2007 |
| WO | WO2007111107 | 10/2007 |
| WO | WO2008/029451 | 3/2008 |

OTHER PUBLICATIONS

Kaili Jiang, Qunqing Li, Shoushan Fan, Spinning continuous carbon nanotube yarns, Nature, Oct. 24, 2002, pp. 801, vol. 419.

Lin Xiao, Zhuo Chen, Chen Feng, Liang Liu et al., Flexible, Stretchable, Transparent Carbon Nanotube Thin Film Loudspeakers, Nano Letters, 2008, pp. 4539-4545, vol. 8, No. 12, US.

Yang Wei, Kaili Jiang, Xiaofeng Feng, Peng Liu et al., Comparative studies of multiwalled carbon nanotube sheets before and after shrinking, Physical Review B, Jul. 25, 2007, vol. 76, 045423.

Strutt John William, Rayleigh Baron, The Theory of Sound, 1926, pp. 226-235, vol. 2.

William Henry Preece, On Some Thermal Effects of Electric Currents, Proceedings of the Royal Society of London, 1879-1880, pp. 408-411, vol. 30.

Braun Ferdinand, Notiz uber Thermophonie, Ann. Der Physik, Apr. 1898, pp. 358-360, vol. 65.

H.D. Arnold, I.B. Crandall, The Thermophone as a Precision Source of Sound, Physical Review, 1917, pp. 22-38, vol. 10.

Zhuangchun Wu, Zhihong Chen, Xu Du et al., Transparent, Conductive Carbon Nanotube Films, Science, Aug. 27, 2004, pp. 1273-1276, vol. 305.

Kai Liu, Yinghui Sun, Lei Chen, Chen Feng, Xiaofeng Feng, Kaili Jiang et al., Controlled Growth of Super-Aligned Carbon Nanotube Arrays for Spinning Continuous Unidirectional Sheets with Tunable Physical Properties, Nano Letters, 2008, pp. 700-705, vol. 8, No. 2.

Lina Zhang, Chen Feng, Zhuo Chen, Liang Liu et al., Superaligned Carbon Nanotube Grid for High Resolution Transmission Electron Microscopy of Nanomaterials, Nano Letters, 2008, pp. 2564-2569, vol. 8, No. 8.

Swift Gregory W., Thermoacoustic Engines and Refrigerators, Physics Today, Jul. 1995, pp. 22-28, vol. 48.

W. Yi, L.Lu, Zhang Dianlin et al., Linear Specific Heat of Carbon Nanotubes, Physical Review B, Apr. 1, 1999, vol. 59, No. 14, R9015-9018.

P. De Lange, On Thermophones, Proceedings of the Royal Society of London. Series A, Apr. 1, 1915, pp. 239-241, vol. 91, No. 628.

Mei Zhang, Shaoli Fang, Anvar A. Zakhidov, Sergey B. Lee et al., Strong, Transparent, Multifunctional, Carbon Nanotube Sheets, Science, Aug. 19, 2005, pp. 1215-1219, vol. 309.

J.J.Hopfield, Spectra of Hydrogen, Nitrogen and Oxygen in the Extreme Ultraviolet, Physical Review, 1922, pp. 573-588, vol. 20.

Frank P. Incropera, David P. Dewitt et al., Fundamentals of Heat and Mass Transfer, 6th ed., 2007, pp. A-5, Wiley:Asia.

Xiaobo Zhang, Kaili Jiang, Chen Feng, Peng Liu et al., Spinning and Processing Continuous Yarns from 4-Inch Wafer Scale Super-Aligned Carbon Nanotube Arrays, Advanced Materials, 2006, pp. 1505-1510, vol. 18.

Edward C. Wente, The Thermophone, Physical Review, 1922, pp. 333-345, vol. 19.

Lin Xiao et al., "Flexible, stretchable, transparent carbon nanotube thin film loudspeakers" vol. 8, No. 12, pp. 4539-4545, 2008.

Lee et al., Photosensitization of nonlinear scattering and photoacoustic emission from single-walled carbon nanotubes, Applied Physics Letters, Mar. 13, 2008, 92, 103122.

Silvanus P. Thompson, The Photophone, Nature, Sep. 23, 1880, vol. XXII, No. 569, pp. 481.

Alexander Graham Bell, Selenium and the Photophone, Nature, Sep. 23, 1880, pp. 500-503.

Amos, S.W.; "Principles of Transistor Circuits"; 2000; Newnes-Butterworth-Heinemann; 9th ed.;p. 114.

Chen, Huxiong; Diebold, Gerald, "Chemical Generation of Acoustic Waves: A Giant Photoacoustic Effect", Nov. 10, 1995, Science, vol. 270, pp. 963-966.

P.M. Ajayan et al., "Nanotubes in a flash-Ignition and reconstruction", Science, vol. 296, Pages:705, Apr. 26, 2002.

F.Kontomichos et al., "A thermoacoustic device for sound reproduction", acoustics 08 Paris, pp. 4349-4353, Jun. 29-Jul. 4, 2008.

F. Kontomichos et al ., "A thermoacoustic device for sound reproduction", acoustics 08' Paris, Jun. 29-Jul. 4, 2008.

* cited by examiner

THERMOACOUSTIC DEVICE

This application claims all benefits accruing under 35 U.S.C. §119 from China Patent Application No. 200810241985.1, filed on Dec. 30, 2008 in the China Intellectual Property Office. The application is also related to copending application entitled, "THERMOACOUSTIC MODULE, THERMOACOUSTIC DEVICE, AND METHOD FOR MAKING THE SAME".

BACKGROUND

1. Technical Field

The present disclosure relates to acoustic devices and, particularly, to a carbon nanotube based thermoacoustic device.

2. Description of Related Art

Acoustic devices generally include a signal device and a sound wave generator electrically connected to the signal device. The signal device inputs signals to the sound wave generator, such as loudspeakers. A loudspeaker is an electroacoustic transducer that converts electrical signals into sound.

There are different types of loudspeakers that can be categorized according to their working principle, such as electro-dynamic loudspeakers, electromagnetic loudspeakers, electrostatic loudspeakers, and piezoelectric loudspeakers. These various types of loudspeakers use mechanical vibration to produce sound waves. In other words they all achieve "electro-mechanical-acoustic" conversion. Among the various types, the electro-dynamic loudspeakers are the most widely used.

A thermophone based on the thermoacoustic effect was made by H. D. Arnold and I. B. Crandall (H. D. Arnold and I. B. Crandall, "The thermophone as a precision source of sound," Phys. Rev. 10, pp 22-38 (1917)). A platinum strip with a thickness of $7 \times 10^{-5}$ cm and a heat capacity per unit area of $2 \times 10^4$ $J/cm^2 \cdot K$ was used as a thermoacoustic element. However, the thermophone adopting the platinum strip produces weak sounds because the heat capacity per unit area of the platinum strip is too high.

What is needed, therefore, is to provide a thermoacoustic device having good sound effect and high efficiency.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
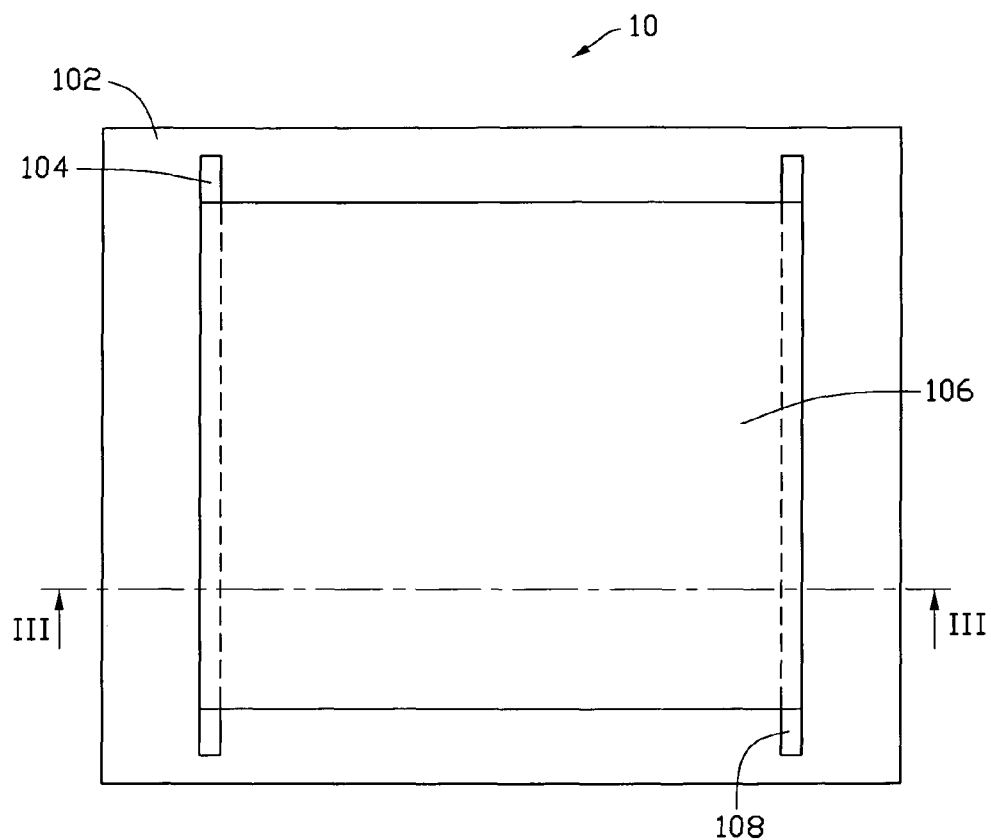
FIG. 1 is a schematic top plan view of one embodiment of a thermoacoustic device.
Figure 2:
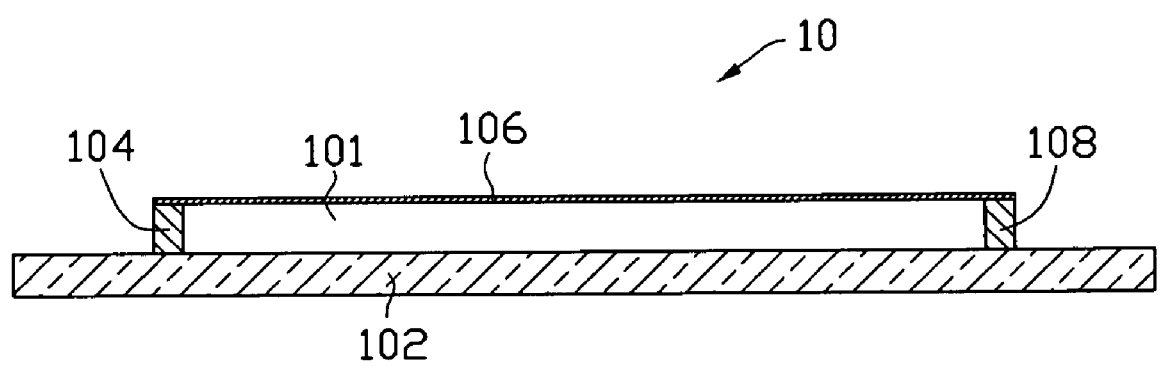
FIG. 2 is a cross-sectional view taken along a line II-II of the thermoacoustic module in FIG. 1.

Referring to FIG. 1 and FIG. 2, one embodiment of a thermoacoustic device 10 includes a substrate 102, a first electrode 104, a second electrode 108, and a sound wave generator 106.

The first electrode 104 and the second electrode 108 are located apart from each other on the substrate 102. The sound wave generator 106 covers the first electrode 104 and the second electrode 108, such that the first electrode 104 and the second electrode 108 are disposed between the substrate 102 and the sound wave generator 106. The sound wave generator 106 can be substantially parallel with the substrate 102. The first electrode 104 and the second electrode 108 are both electrically connected to the sound wave generator 106. The sound wave generator 106 is suspended on the substrate 102 via the first electrode 104 and the second electrode 108. Thus, a space 101 is cooperatively defined by the substrate 102, the first electrode 104, the second electrode 108, and the sound wave generator 106.

The substrate 102 is configured to support the first electrode 104, the second electrode 108 and the sound wave generator 106. There is no particular restriction on the shape of the substrate 102 and it may be appropriately selected depending on the purpose, for example, the shape of the sound wave generator 106. A material of the substrate 102 can be selected from an insulative material or material with poor electrical conductivity, such as glass, resin and ceramic. The substrate 102 can have a good thermal insulating property to prevent the substrate 102 from absorbing heat generated by the sound wave generator 106. The substrate 102 can have a planar and/or a curved surface. In one embodiment, the substrate 102 is a square glass sheet, with a length and a width of about 4.5 centimeters, and a thickness of about 1 millimeter.

The first electrode 104 and the second electrode 108 are made of conductive material. The shape of the first electrode 104 or the second electrode 108 is not limited and can be lamellar-shape, rod-shape, wire-shape, and block-shape, among other shapes. The cross sectional shape of the first electrode 104 or the second electrode 108 can be round, square, trapezium, triangular or polygonal. A thickness of the first electrode 104 or the second electrode 108 can be any size, depending on the design, and can be about 1 micrometer to about 1 centimeter. The first electrode 104 and the second electrode 108 can be fixed on a surface of the substrate 102 via mechanical method or conductive adhesive. The sound wave generator 106 forms a linear or point contact with the first electrode 104 and the second electrode 108 to prevent the first electrode 104 and the second electrode 108 from absorbing heat generated by the sound wave generator 106. A material of the first electrode 104 or the second electrode 106 can be metals, conductive adhesives, carbon nanotubes, and indium tin oxides among other materials.

The orientation between the first electrode 104 and the second electrode 106 can be any configuration depending on the design. In one embodiment, the first electrode 104 and the second electrode 108 are linear-shaped and substantially parallel to each other. The thickness of the first electrode 104 and the second electrode 108 are both about 15 micrometers. The first electrode 104 and the second electrode 108 are linear-shaped silver paste layers. The linear-shaped silver paste layers are formed on the substrate 102 via a screen-printing method.

The space 101 can allow the sound wave generator to sufficiently contact the surrounding medium and have sufficient heat exchange with the surrounding medium. Thus, the electrical-sound transforming efficiency of the thermoacoustic device 10 can be increased, and the thermoacoustic device 10 has good sound effect and high efficiency. A height of the space 101 is determined by the thickness of the first electrode 104 and the second electrode 108. In one embodiment, the height of the space 101 is about 15 micrometers, so a distance between the sound wave generator 106 and the substrate 102 is about 15 micrometers.

A conductive adhesive layer (not shown) can be further provided between the sound wave generator 106 and the electrodes 104, 108. The conductive adhesive layer can be located on a contacting surface of the sound wave generator 106. The conductive adhesive layer can provide a stronger bond between the sound wave generator 106 and the electrodes 104, 108 if needed. The sound wave generator 106 can form a linear or point contact with the adhesive layer. In one embodiment, the conductive adhesive layer is a layer of silver paste.

The sound wave generator 106 includes a carbon nanotube structure. The carbon nanotube structure can be many different structures and have a large specific surface area. In one embodiment, the heat capacity per unit area of the carbon nanotube structure can be less than or equal to about $2 \times 10^{-4}$ $J/cm^2 \cdot K$. In one embodiment, the heat capacity per unit area of the carbon nanotube structure is less than or equal to about $1.7 \times 10^{-6}$ $J/cm^2 \cdot K$. The carbon nanotube structure can include a plurality of carbon nanotubes uniformly distributed therein, and the carbon nanotubes therein can be combined by van der Waals attractive force therebetween. It is understood that the carbon nanotube structure must include metallic carbon nanotubes. The carbon nanotubes in the carbon nanotube structure can be orderly or disorderly arranged. The term 'disordered carbon nanotube structure' means a structure where the carbon nanotubes are arranged along many different directions, and/or entangled with each other. 'Ordered carbon nanotube structure' means a structure where the carbon nanotubes are arranged in a consistently systematic manner, e.g., the carbon nanotubes are arranged approximately along a same direction and or have two or more sections within each of which the carbon nanotubes are arranged approximately along a same direction (different sections can have different directions). The carbon nanotubes in the carbon nanotube structure can be selected from single-walled, double-walled, and/or multi-walled carbon nanotubes. It is also understood that there may be many layers of ordered and/or disordered carbon nanotube films in the carbon nanotube structure.

The carbon nanotube structure can include at least one carbon nanotube film, at least linear carbon nanotube structure or combination thereof. The carbon nanotube structure may have a substantially planar structure. The smaller the specific surface area of the carbon nanotube structure, the greater the heat capacity will be per unit area. The larger the heat capacity per unit area, the smaller the sound pressure level of the thermoacoustic device.

In one embodiment, the carbon nanotube film can be a drawn carbon nanotube film drawn from a carbon nanotube array. Examples of the drawn carbon nanotube film is taught by U.S. Pat. No. 7,045,108 to Jiang et al., and WO 2007015710 to Zhang et al. The drawn carbon nanotube film includes a plurality of successive and oriented carbon nanotubes joined end-to-end by van der Waals attractive force therebetween. The axis of each carbon nanotube in the drawn carbon nanotube film can be substantially oriented in a single direction. In one embodiment, an axis direction of the carbon nanotubes is substantially perpendicular to an axis direction of the first electrode 104 and the second electrode 108.

The carbon nanotube structure of the sound wave generator 106 can also include at least two stacked carbon nanotube films. In other embodiments, the carbon nanotube structure can include two or more coplanar carbon nanotube films. These coplanar carbon nanotube films can also be stacked upon other films. The number of the layers of the carbon nanotube films is not limited. Stacking the carbon nanotube films will add to the structural integrity of the carbon nanotube structure. In some embodiments, the carbon nanotube structure has a free standing structure. The terms "free standing" means a structure that can keep its shape via just two structural supports. However, a large enough specific surface area must be maintained to achieve the thermoacoustic effect.

In one embodiment, the carbon nanotube structure includes four layers of drawn carbon nanotube films stacked upon each other, and axis directions of the carbon nanotubes in every two contacting carbon nanotubes are substantially perpendicular. A width and a length of the carbon nanotube film are both about 3 centimeters. The carbon nanotube structure having four drawn carbon nanotube films have good light transparency and structural integrity.

The carbon nanotube structure comprises a plurality of carbon nanotubes and has a small heat capacity per unit area. The carbon nanotube structure can have a large area to cause pressure oscillations in the surrounding medium by the temperature waves generated by the sound wave generator 106. In use, when signals, such as electrical signals, with variations in the application of the signal and/or strength are applied to the carbon nanotube structure of the sound wave generator 106, heating is produced in the carbon nanotube structure according to the variations of the signal and/or signal strength. Temperature waves, which are propagated into the surrounding medium are obtained. The temperature waves produce pressure waves in the surrounding medium, resulting in sound generation. In this process, it is the thermal expansion and contraction of the medium in the vicinity of the sound wave generator 106 that produces sound. This is distinct from the mechanism of the conventional loudspeaker, in which the pressure waves are created by the mechanical movement of the diaphragm. When the input signals are electrical signals, the operating principle of the thermoacoustic device 10 is an "electrical-thermal-sound" conversion. When the input signals are optical signals, the operation principle of the thermoacoustic device 10 is an "optical-thermal-sound" conversion. Energy of the optical signals can be absorbed by the sound wave generator 106 and the resulting energy will then be radiated as heat. This heat causes detectable sound signals due to pressure variation in the surrounding (environmental) medium.

The thermoacoustic device 10, of the embodiment shown in FIG. 1, has a wide frequency response range and a high sound pressure level. The sound pressure level of the sound waves generated by the thermoacoustic device 10 can be greater than 50 dB. The frequency response range of the thermoacoustic device 10 can be from about 1 Hz to about 100 KHz with a power input of 4.5 W. The total harmonic distortion of the thermoacoustic device 10 is extremely small, e.g., less than 3% in a range from about 500 Hz to 40 KHz.

Figure 3:
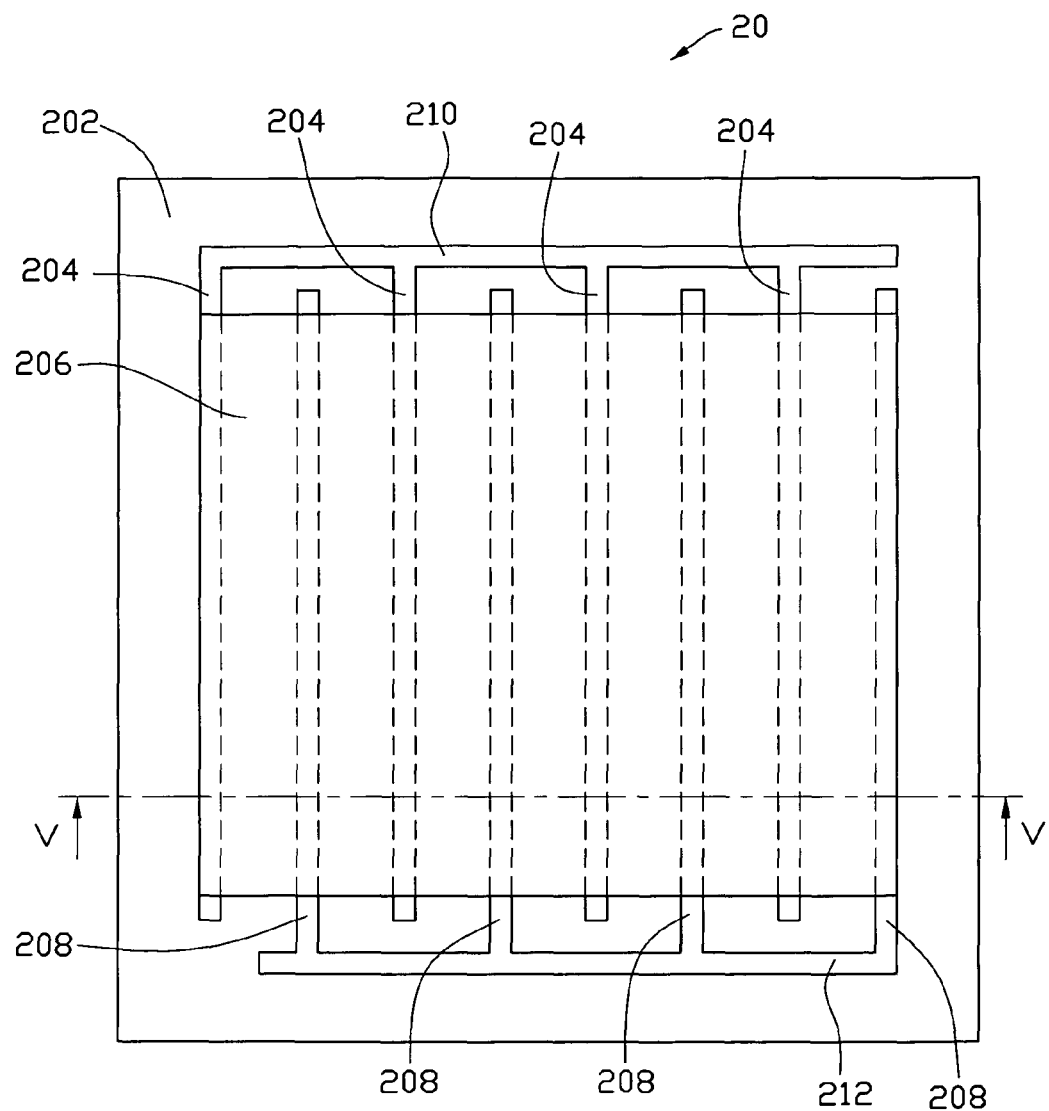
FIG. 3 is a schematic top plan view of one embodiment of a thermoacoustic device.
Figure 4:
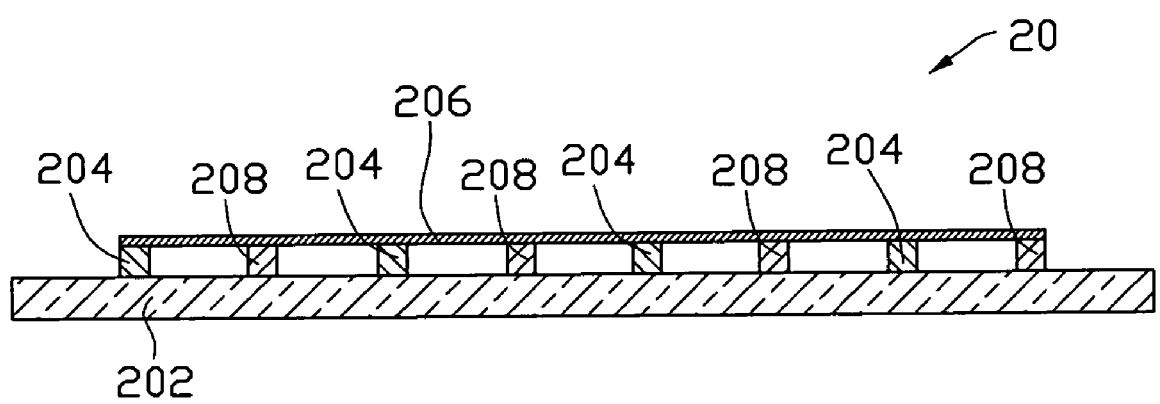
FIG. 4 is a cross-sectional view taken along a line IV-IV of the thermoacoustic module in FIG. 3.

Referring to FIGS. 3 and 4, another embodiment of a thermoacoustic device 20 includes a substrate 202, a plurality of first electrodes 204, a plurality of second electrodes 208, and a sound wave generator 206. The thermoacoustic device 20 further includes a first electrode lead wire 210 and a second electrode wire 212. The plurality of first electrodes 204 and the plurality of second electrodes 208 are located on the substrate 202. The sound wave generator 206 covers the first electrodes 204 and the second electrodes 208.

The first electrodes 204 and the second electrodes 208 are located apart from each other on the substrate 202. The plurality of the first electrodes 204 and the plurality of the second electrodes 208 are alternatively disposed, with one first electrode 204 and one second electrode 208 at opposite ends. The number of the first electrodes 204 and the number of the second electrodes 208 are equal. The first electrodes 204 and the second electrodes 208 can be substantially parallel to each other with a same distance between the adjacent first electrode 204 and the second electrode 208. The distance between the adjacent first electrode 204 and the second electrode 208 can be any designed range, such as from about 10 micrometer to about 1 centimeter. The portion of the sound wave generator 206 between every two adjacent first electrode 204 and second electrode 208 is suspended from the substrate 202. In one embodiment, according to FIG. 3 and FIG. 4, the thermoacoustic device 20 includes four linear first electrodes 204 and four linear second electrodes 208, with a distance of about 5 millimeters between every two adjacent first electrodes 204 and second electrodes 208, lengths of the first electrode 204 and the second electrode 208 are both about 3 centimeters, and heights of the first electrode 204 and the second electrode 208 are both about 15 micrometers.

The first electrode lead wire 210 is electrically connected with the first electrodes 204. The second electrode lead wire 212 is electrically connected with the second electrode 208. The thermoacoustic device 20 can electrically connect with a power source via the first lead wire 210 and the second lead wire 212.

The other characteristics of the thermoacoustic device 20 are similar to the thermoacoustic device 10 disclosed above.

Figure 5:
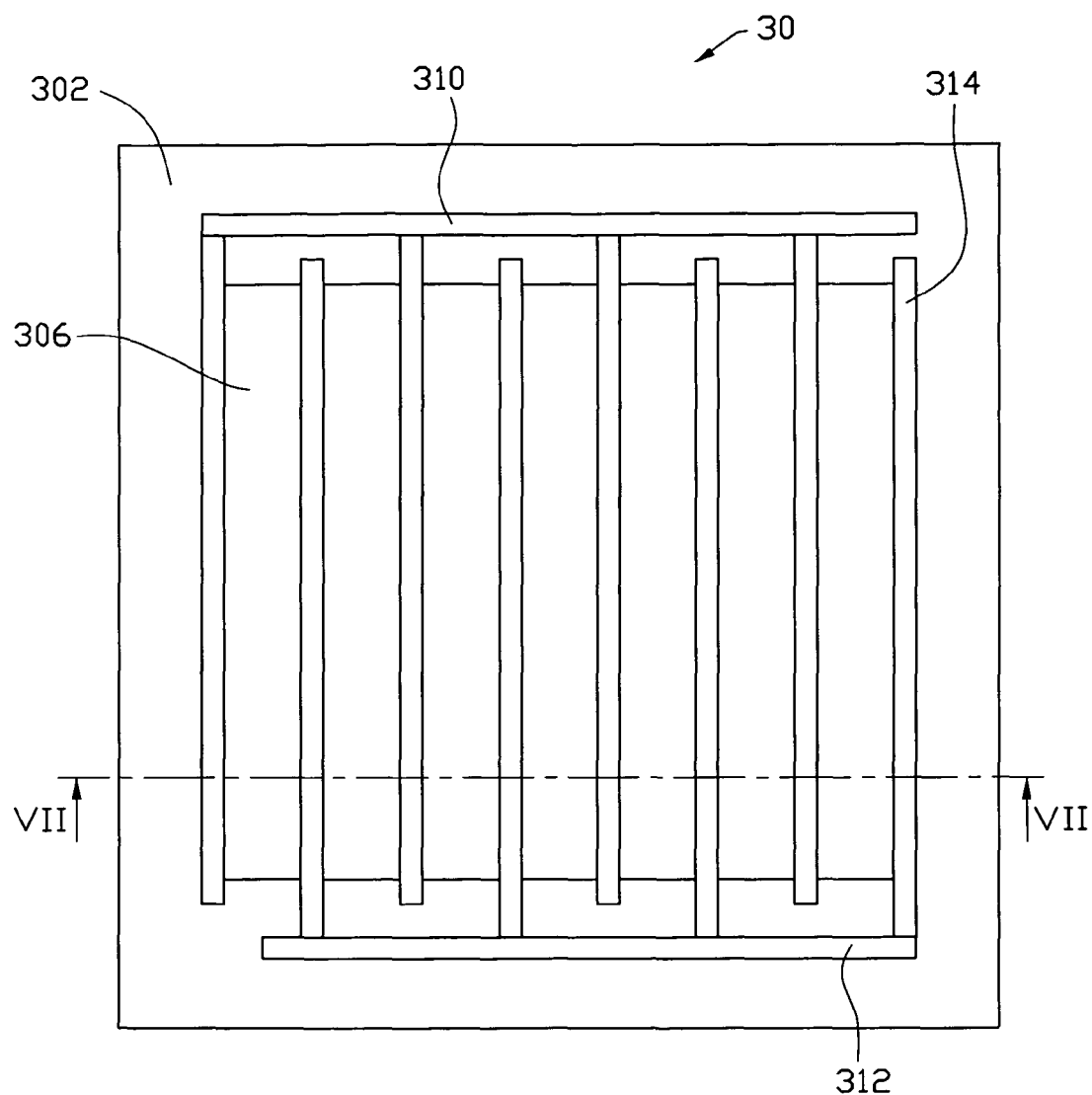
FIG. 5 is a schematic top plan view of one embodiment of a thermoacoustic device.
Figure 6:
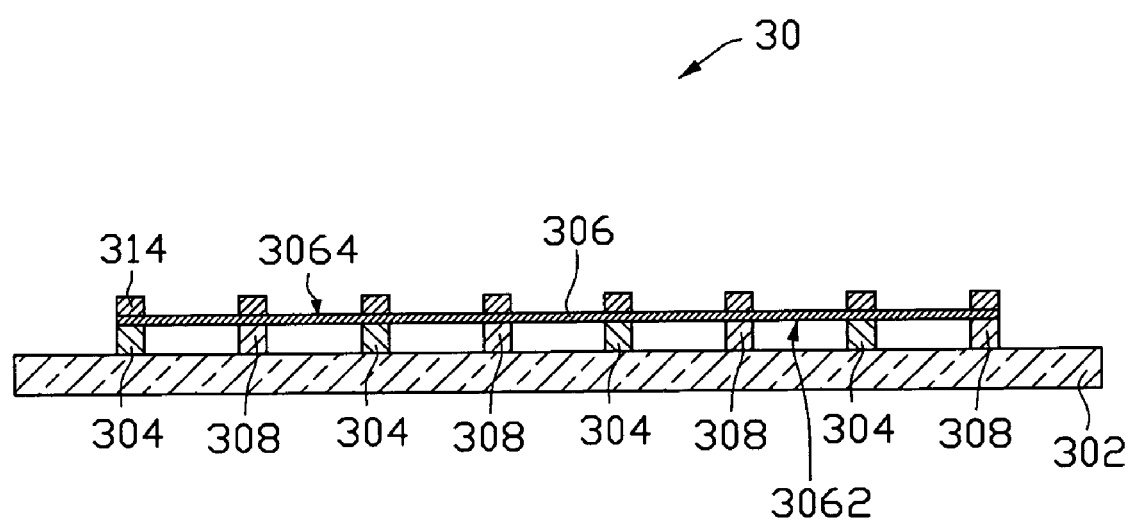
FIG. 6 is a cross-sectional view taken along a line VI-VI of the thermoacoustic module in FIG. 5.

Referring to FIGS. 5 and 6, yet another embodiment of a thermoacoustic device 30 includes a substrate 302, a plurality of first electrodes 304, a plurality of second electrodes 308, a first electrode lead wire 310, a second electrode lead wire 312, and a sound wave generator 306. The plurality of first electrodes 304 and the plurality of second electrodes 308 are located on the substrate 302. The sound wave generator 306 has a first surface 3062 and a second surface 3064 opposite the first surface 3064. The sound wave generator 306 covers the plurality of first electrodes 304 and the plurality of second electrodes 308, and the first surface 3062 of the sound wave generator 306 contacts the first electrodes 304 and the second electrodes 308. The portion of the sound wave generator 306 between every two adjacent first electrodes 304 and second electrode 308 is suspended on the substrate 302.

The thermoacoustic device 30 further includes a plurality of fixed elements 314 disposed on the second surface 3064 of the sound wave generator 306. One fixed element 314 is supported by one first electrode 304 or one second electrode 308. The sound wave generator 306 is fixed by the fixed elements 314, between the first electrodes 304 and the fixed elements 314, and/or between the second electrodes 308 and the fixed elements 314. As such, the sound wave generator 306 would have a good electrical connection with the first electrodes 306 and the second electrodes 308.

The shapes of the fixed elements 314 are not limited and can be lamellar, rod, wire, and block among other shapes. The cross sectional shape of the fixed elements 314 can be round, square, trapezium, triangular or polygonal. A height of the fixed elements 314 can be any height, such as about 0.1 micrometer to about 1 centimeter. A shape of the contacting surface between the fixed elements 314 and the sound wave generator 306 could be linear-shaped or point-shaped to prevent the fixed elements 314 from absorbing heat generated by the sound wave generator 306. The fixed elements 314 can be made of conductive materials such as metals, conductive adhesives, and indium tin oxides, or insulative materials such as glass, ceramic, and polymer.

In one embodiment according to FIG. 5 and FIG. 6, the thermoacoustic device 30 includes four linear-shaped first electrodes 304, four linear-shaped electrodes 308, and eight linear-shaped fixed elements 314. Each fixed element 304 corresponds to one first electrode 304 or one second electrode 308. The diameter of the linear-shaped fixed elements 314 is the same as the first electrodes 304 and the second electrodes 308 length of the fixed elements 314 is about 3 centimeters, which is the same as the first electrodes 304 and the second electrodes 308, and the height of the fixed elements 314 is about 10 micrometers.

The other characters of the thermoacoustic device 30 are similar to the thermoacoustic device 20 disclosed above.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate rather than limit the scope of the present disclosure.

What is claimed is:

1. A thermoacoustic device, comprising:
a substrate;
at least one first electrode disposed on the substrate;
at least one second electrode disposed on the substrate;
a sound wave generator electrically connected to the at least one first electrode and the at least one second electrode, the sound wave generator comprising a carbon nanotube structure;
wherein the carbon nanotube structure is suspended from the substrate via the at least one first electrode and the at least one second electrode, and is capable of generating heat and transferring the heat to a medium in contact with the carbon nanotube structure to cause a thermoacoustic effect.

2. The thermoacoustic device of claim 1, wherein the heat capacity per unit area of the carbon nanotube structure is less than or equal to $2 \times 10^{-4}$ J/cm$^2$·K.

3. The thermoacoustic device of claim 1, wherein the at least one first electrode and the at least one second electrode are lamellar-shaped, rod-shaped, wire-shaped, or block-shaped.

4. The thermoacoustic device of claim 1, wherein the sound wave generator forms a line contact or point contact with the at least one first electrode and the at least one second electrode.

5. The thermoacoustic device of claim 1, where the at least one first electrode and the at least one second electrode is made of a material selected from the group consisting of metals, conductive adhesives, carbon nanotubes, and indium tin oxides.

6. The thermoacoustic device of claim 1, wherein the at least one first electrode and the at least one second electrode have a thickness ranging from about 1 micrometer to about 1 centimeter.

7. The thermoacoustic device of claim 1, wherein the first electrode and the second electrode are linear silver paste layers formed on the substrate via a screen-printing method.

8. The thermoacoustic device of claim 1, wherein the carbon nanotube structure is spaced from the substrate a distance ranging from about 1 micrometer to about 1 centimeter.

9. The thermoacoustic device of claim 1, wherein a plurality of first electrodes and a plurality of second electrodes are electrically connected to the carbon nanotube structure, and the plurality of first electrodes and the plurality of second electrodes are alternatively disposed on the substrate.

10. The thermoacoustic device of claim 9, wherein the number of the first electrodes and the number of the second electrodes are equal.

11. The thermoacoustic device of claim 10, wherein a distance between every two adjacent first electrode and second electrode is substantially equal, and the distance ranges from about 10 micrometers to about 1 centimeter.

12. The thermoacoustic device of claim 10, wherein the first electrodes and the second electrodes are linear-shaped and substantially parallel to each other.

13. The thermoacoustic device of claim 12, wherein the carbon nanotube structure comprises a plurality of carbon nanotubes, an axis of each carbon nanotube in the carbon nanotube structure is substantially oriented in a single direction and substantially perpendicular to an axis direction of the first electrode and the second electrode.

14. The thermoacoustic device of claim 9, further comprising a first electrode lead wire electrically connected to the plurality of first electrodes and a second electrode lead wire electrically connected to the plurality of second electrodes.

15. A thermoacoustic device, comprising:
a substrate;
a plurality of first electrodes and a plurality of second electrodes, the plurality of first electrodes and the plurality of second electrodes being alternatively disposed on the substrate;
a sound wave generator comprising a first surface and a second surface opposite the first surface, the first surface of the sound wave generator contacting with the plurality of first electrodes and the plurality of second electrodes, the sound wave generator comprising a carbon nanotube structure;
a plurality of fixed elements contacting with the second surface of the sound wave generator;
wherein the sound wave generator is suspended from the substrate and capable of generating heat and transferring the heat to a medium in contact with the carbon nanotube structure to cause a thermoacoustic effect.

16. The thermoacoustic device of claim 15, wherein the number of the fixed elements and the number of the first electrodes and the second electrodes are equal.

17. The thermoacoustic device of claim 15, wherein the fixed elements are made of conductive material.

18. A thermoacoustic device, comprising:
a substrate;
a plurality of first electrodes and a plurality of second electrodes, the plurality of first electrodes and the plurality of second electrodes alternatively disposed on the substrate;
a sound wave generator contacting the plurality of first electrodes and the plurality of second electrodes, the sound wave generator comprising a carbon nanotube structure capable of generating heat and transferring the heat to a medium in contact with the carbon nanotube structure to cause a thermoacoustic effect;
wherein the sound wave generator is suspended on the substrate via the first electrodes and the second electrodes.

19. The thermoacoustic device of claim 18, wherein the first electrode and the second electrode are linear-shaped silver paste layers.

20. The thermoacoustic device of claim 18, wherein the heat capacity per unit area of the carbon nanotube structure is less than or equal to $2 \times 10^{-4}$ J/cm$^2 \cdot$K.

* * * * *